Feb. 28, 1928.
W. HOPPE
VEHICLE SIGNAL DEVICE
Filed July 8 1927
1,661,071
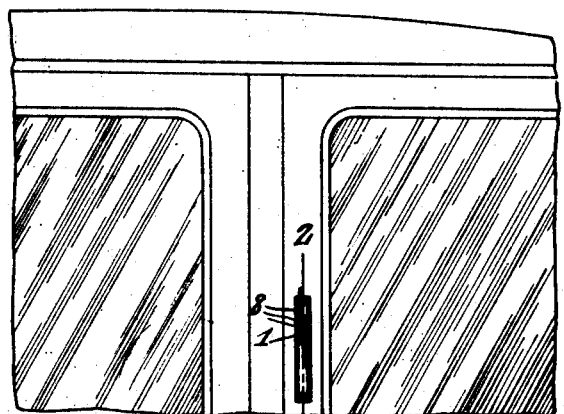
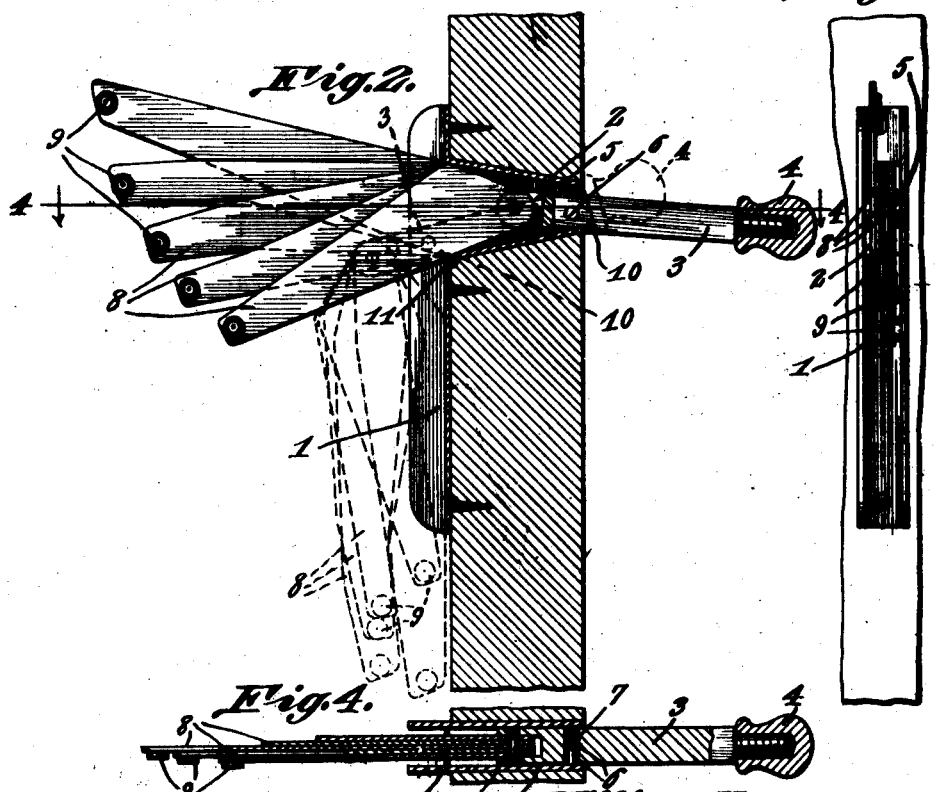
William Hoppe, INVENTOR
ATTORNEY Patented Feb. 28, 1928.

1,661,071

UNITED STATES PATENT OFFICE.

WILLIAM HOPPE, OF TACOMA, WASHINGTON.

VEHICLE SIGNAL DEVICE.

Application filed July 8, 1927. Serial No. 204,334.

This invention relates to a signal for vehicles, the general object of the invention being to provide hand operated means for signalling that the driver intends to make a turn, the device being so formed that it can be used in a closed type of vehicle.

Another object of the invention is to so form the device that it will resemble an open hand when in operative position.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a fragmentary view of a vehicle, showing the invention applied thereto.

Figure 2 is a section on line 2—2 of Figure 1.

Figure 3 is a view similar to Figure 1, but showing the parts enlarged.

Figure 4 is a section on line 4—4 of Figure 2.

In these views 1 indicates a channel member which is provided with a tubular projection 2 on its bottom which has its upper and lower walls converging. This channel member is adapted to be fastened to a part of the vehicle as shown in the drawings, with the projection 2 passing through a hole formed in the vehicle with the free end of the projection flush with the inner wall of the part which it passes through. A stem 3 is movably arranged in the projection and has a knob 4 on its inner end, the outer end being forked, as shown at 5. A hole is made in the stem adjacent its forked end and a pair of plugs 6 is placed in the hole with a spring 7 between the plugs, this spring acting to force the plugs outwardly against the sides of the part 2 to frictionally hold the stem in adjusted position in the member 2.

A number of flat pieces 8 are pivoted at their inner ends in the forked part of the stem, these pieces being arranged in fanlike formation and are so shaped that when the stem is pulled inwardly, their edges engaging the outer end of the part 2 will cause said pieces to move apart and assume a position which simulates the human hand with the fingers extended. When the stem is pushed outwardly to the dotted line position shown in Figure 2, the pieces 8 will drop downwardly under the action of gravity and assume the position shown in dotted lines in Figure 2. A reflector 9 is fastened to the outer end of each piece 8 on its rear face so as to reflect the rays of light from a vehicle following the vehicle on which the device is placed so that the signal can be seen at night as well as during the day.

A notch 10 is formed in the stem 3 adjacent the forked end and a part of the inner end of the member 2 will engage the notch when the stem is pulled inwardly to hold the parts in operative position. When the device is to be moved into an inoperative position, the stem is first lifted slightly so as to move the notched part away from the end of the projection 2 and then the stem is pushed outwardly so that the finger forming parts 8 will drop into inoperative position. A pin 11 is placed at the lower part of the outer end of the member 2 over which the members will pass as they are moved inwardly and outwardly during the operation of the device.

From the foregoing it will be seen that I have provided a simple signal which can be easily and quickly applied to a motor vehicle and which can be easily operated by the hand of the driver. With this device, the driver can signal the drivers of other cars from a closed car as well as he could signal from an open car with his hand.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A signal of the class described comprising a channel-shaped support adapted to be fastened to a side of a motor vehicle and having a tubular inwardly extending part adjacent one end thereof adapted to pass through a hole formed in the side of the vehicle, said inwardly extending part having a wide outer end and a narrow inner end, a stem movably arranged in the tubular part, a handle on the inner end of the stem, finger-like members pivoted in fan-shaped arrangement to the outer end of the stem and shaped so that they will move away from each other when the outer end of the stem is drawn into the tubular part, said stem having a notch therein for engaging the end of the tubular part for holding the device in operative position and reflectors fastened to the outer ends of the finger-like parts on their rear faces.

In testimony whereof I affix my signature.

WILLIAM HOPPE.